Patented June 8, 1948

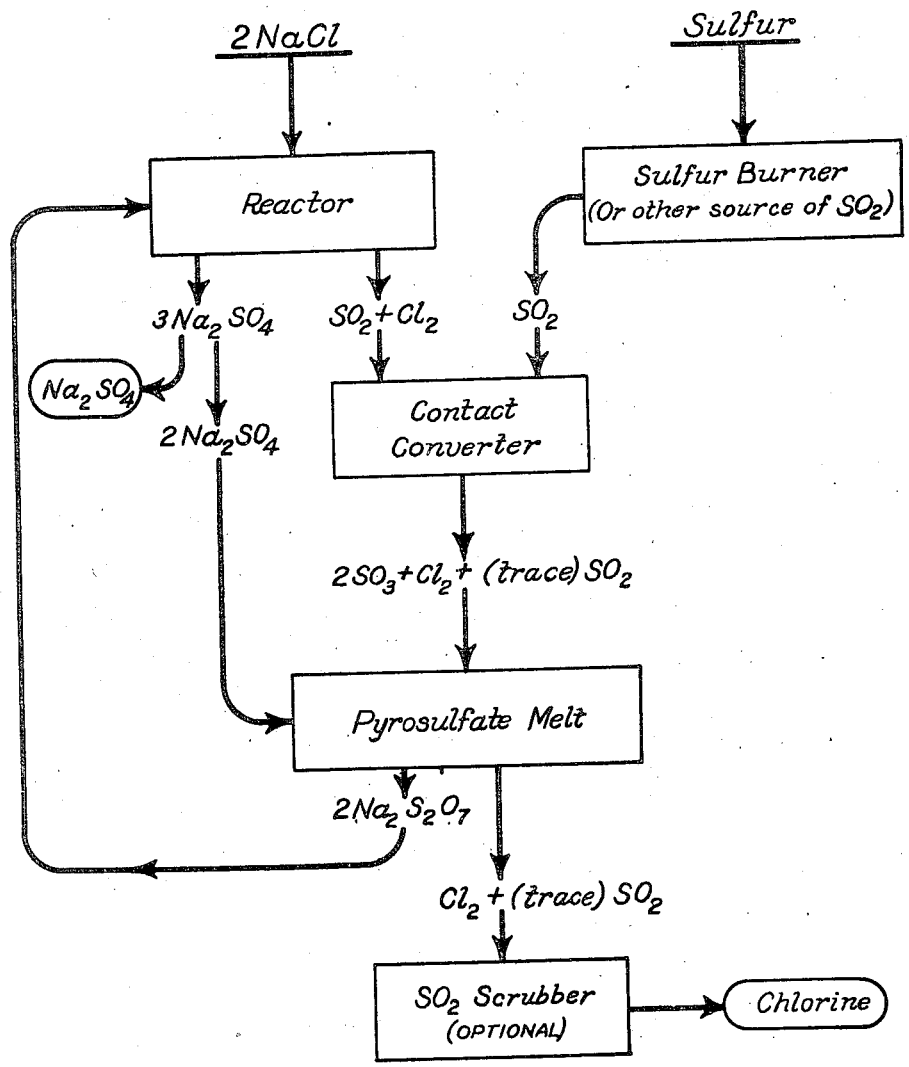

2,442,874

UNITED STATES PATENT OFFICE 2,442,874

CYCLIC PROCESS FOR THE MANUFACTURE OF SODIUM SULFATE AND CHLORINE

Jonas Kamlet, New York, N. Y.

Application February 21, 1947, Serial No. 730,142

11 Claims. (Cl. 23—121)

This invention relates to a cyclic process for the manufacture of sodium sulfate and chlorine. More particularly, it relates to a cyclic process whereby sodium sulfate and chlorine may be manufactured from cheap and readily available raw materials, viz: ordinary salt (sodium chloride), sulfur dioxide and air.

An industrially practicable process for the manufacture of sodium sulfate (salt cake) and chlorine from salt and sulfur dioxide has long been sought by the chemical process industries. Thus, Longmaid (in 1845) and MacFarlane (in 1863) attempted to effect this conversion by roasting sulfide ores with salt in the presence of excess air, the sulfide ores serving as a source of sulfur dioxide. Clemm (German Patent 115,250 (1899); Chem. Zentralblatt, 1900, II, 1222) passed a mixture of $SO_2$ and an oxygen-containing gas over salt admixed with alumina or gypsum, at advanced temperatures, whereby the reaction:

$$2NaCl + SO_2 + O_2 \rightarrow Na_2SO_4 + Cl_2$$

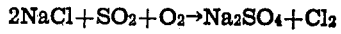

was said to occur. A similar process was also patented by Schmidt and the Zellstoff-Fabrik Waldhof (French Patent 607,483 (1925); Chem. Zentralblatt 1926, II, 1781). None of the aforementioned processes proved to be commercially feasible, usually due to low yields, excessive reaction periods and high fuel consumption. Johnstone and Winsche (Ind. Eng. Chem., 36, 435–439 (May, 1944)) have shown that this reaction proceeds much too slowly, even at advanced temperatures, to possess any practical utility.

More recently, it has been proposed to react sodium chloride with sulfur trioxide gas to form sodium chlorsulfonate (Iler, U. S. Patent 2,219,-103 (1940)), and to decompose the latter at advanced temperatures, either as a separate step (Iler, U. S. Patent 2,259,248 (1941)) or in the same reactor (Iler, U. S. Patents 2,375,000-1-2 (1945)) whereby sodium sulfate is obtained and a mixture of sulfur dioxide and chlorine gases is evolved.

The sulfur dioxide and chlorine in the gas mixture may be separated by differential solution in a solvent (Farrell and Eichelberger, U. S. Patent 2,377,138 (1945)), by fractional distillation (Carlson, U. S. Patent 2,381,876 (1945)), by selective adsorption of one of the components of the mixture (Hixson and Miller, U. S. Patent 2,340,961 (1944); McAdam, U. S. Patent 2,375,-011 (1945)), or by other means. The separated sulfur dioxide may then be oxidized to sulfur trioxide by any of the procedures well known to the art, and returned to the process. These steps may also be combined by passing the gas mixture containing sulfur dioxide and chlorine through a vanadium-catalyst sulfuric acid contact converter, whereby the $SO_2$ is oxidized to $SO_3$ without changing the chlorine. The resultant mixture of $SO_3$ and $Cl_2$ is then reacted with sodium chloride, which will interact with the $SO_3$ to regenerate the sodium chlorsulfonate (or its decomposition products, depending on the reaction temperature), and yield a by-product of a chlorine-containing gas, substantially free of $SO_2$ and $SO_3$ (Laury, U. S. Patent 2,254,014 (1941)).

The great disadvantage of the aforementioned processes resides in the necessity of reacting a highly corrosive gas (sulfur trioxide) with a difficulty fusible solid (sodium chloride). This requires complicated and expensive equipment for the proper attrition and admixture of the reagents and presents a very considerable equipment corrosion problem.

The purpose of the present invention is to provide a cyclic process for the manufacture of sodium sulfate and chlorine from salt and sulfur dioxide which does not involve at any point of the process the interaction of a gaseous and a solid component, and which obviates the technical difficulties inherent in the processes of the prior art.

My invention may best be understood by reference to the accompanying drawing, which represents a flow-sheet of the process, and by reference to a series of equations which describe the chemical reactions effected in each step. It is understood, of course, that the present invention is in no ways limited to the exact quantities or equipment described herein, but rather that these reagents, proportions or conditions are given by way of example and that obvious improvements will occur to any person skilled in the art.

Step A.—In the "reactor," a mixture of two moles of sodium pyrosulfate and two moles of sodium chloride are heated together at a temperature of from 325° C. to 600° C., and preferably between 525° C. and 575° C. The following reaction occurs:

$$2Na_2S_2O_7 + 2NaCl \rightarrow 3Na_2SO_4 + SO_2 + Cl_2$$

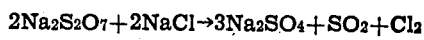

Step B.—The hot gas mixture, evolved during step A, comprising one mole of sulfur dioxide and one mole of chlorine, is admixed with an additional mole of sulfur dioxide (derived from a sulfur burner, or from the roasting of a sulfide ore, or from any other convenient source) and with sufficient air or other oxygen-containing gas, and passed through a catalytic sulfuric acid contact converter, the catalyst of which is not poisoned by chlorine (as, for example, the commonly employed vanadium catalyst converters). The mixture of $SO_2$ and $Cl_2$ is oxidized to a mixture of $SO_3$ and $Cl_2$:

$$2SO_2 + Cl_2 + O_2 \rightarrow 2SO_3 + Cl_2$$

*Step C.*—To a melt of preformed sodium pyrosulfate, maintained at a temperature between 400° C. and 460° C., two moles of the sodium sulfate obtained in step A are added while simultaneously passing the gas mixture obtained in step B (containing two moles of $SO_3$ and one mole of $Cl_2$ concurrently or countercurrently through the melt. The $SO_3$ in the gas mixture will react readily with the sodium sulfate added to the melt, to form sodium pyrosulfate:

$$2Na_2SO_4 + 2SO_3 \rightarrow 2Na_2S_2O_7$$

while the chlorine in the original gas mixture will pass through the melt unchanged, and may thenceforth be recovered and utilized as desired.

Thus, if the sodium sulfate and the gas mixture containing $SO_3$ are added to the melt of preformed sodium pyrosulfate at an approximately equimolar rate, the sodium pyrosulfate formed by their interaction may be continuously removed from the mass of the pyrosulfate melt, without diminishing the volume of the melt. This step lends itself most particularly to continuous operation.

There are thus obtained the two moles of sodium pyrosulfate required for the reaction with two moles of sodium chloride in step A. It will be noted that at no point in the process does it become necessary to react a gas with a solid. The interaction of the gas mixture of $SO_3$ and $Cl_2$ with the liquid melt of sodium pyrosulfate containing dissolved sodium sulfate (step C) is achieved technically without difficulty and by the use of relatively simple and inexpensive equipment. The raw materials are added to the cyclic process at the following points:

(a) Two moles of sodium chloride at the reactor (step A), and (b) One mole of sulfur dioxide and one mole of oxygen (as air, or an oxygen-containing gas—not represented in the flow sheet) at the contact converter (step B).

The end-products of the cyclic process are recovered at the following points:

(c) One mole of the three moles of sodium sulfate produced at the reactor (step A); the other two moles are recycled to the pyrosulfate melt (step C), and (d) One mole of chlorine recovered from the passage of the gas mixture through the pyrosulfate melt (step C).

The overall equation for the process of the present invention may therefore be given as:

$$2\ NaCl + SO_2 + O_2 \rightarrow Na_2SO_4 + Cl_2$$

i. e. the actual conversion long sought after but never previously achieved in an industrially practicable process.

The reactor—Step A

This step can be effected on a batch-wise or on a continuous basis. On a batch-wise basis, the hot sodium pyrosulfate discharged from the pyrosulfate melt (step C) at a temperature of about 400° C. to 460° C., is admixed with the sodium chloride, preferably finely ground, and heated in a suitable space reactor at a temperature between 325° C. and 600° C., and preferably between 525° C. and 575° C. A muffle furnace or a Mannheim salt-cake furnace may be employed as a space reactor, each batch being charged and removed individually.

On a continuous basis, the hot sodium pyrosulfate is added concurrently with the sodium chloride, preferably finely ground, to a rotary reactor, such as a rotary kiln or a direct-fired Laury rotary salt-cake furnace, the hot section of which is maintained at a temperature between 325° C. and 600° C., and preferably between 525° C. and 575° C.

In either case, the hot gas mixture evolved during this step is admixed with an additional mole of $SO_2$ and passed to the contact converter (step B). Of the three moles of sodium sulfate obtained as end-products of the reaction, one mole represents the salable end-product of the process, and two moles are returned, while still hot, to the pyrosulfate melt (step C).

The contact converter—Step B

The mixture of one mole of $SO_2$ and one mole of $Cl_2$, discharged from the reactor (step A) at a temperature of 450°–500° C., under preferred conditions, is now mixed with an additional mole of $SO_2$ (derived from a sulfur burner, by roasting pyrites, or from any other convenient source). At this point, it is feasible so to adjust the ratio of $SO_2$ to oxygen in the added sulfur dioxide (i. e. "burner gas") that the mixture, when added to the $SO_2$ and $Cl_2$ mixture, will then contain the optimum overall $SO_2$ to oxygen ratio for the catalyst being used in the contact converter.

With the standard vanadium catalysts, the conversion is effected at temperatures of 375° C. to 500° C. The oxidation of $SO_2$ to $SO_3$ is strongly exothermic, so that the gas mixture, although charged at 400° C., may be discharged at 520° C. In effect, the conversion of $SO_2$ to $SO_3$ proceeds with an efficiency of 92% to 98%, and the end-product is a mixture of sulfur trioxide, chlorine and small quantities of sulfur dioxide. In order to maintain the proper materials balance for the process, it is therefore desirable to add slightly more than one mole of additional $SO_2$ to the hot $SO_2$ and $Cl_2$ mixture from the reactor (step A), said small additional quantities of $SO_2$ being equivalent to the unconverted 2% to 8% of sulfur dioxide of the contact converter feed gas.

The pyrosulfate melt (step C)

The hot mixture of two moles of $SO_3$ and one mole of $Cl_2$ (containing small amounts of $SO_2$) discharged from the contact converter (step B) at temperatures in excess of 400° to 500° C., is now finely divided or dispersed, and passed through a mass of molten sodium pyrosulfate. At the same time, two-thirds of the sodium sulfate discharged from the reactor (step A), i. e., two moles, at a preferred temperature of 425° C. to 450° C. is added to the melt in a concurrent or countercurrent stream, and at a molar rate approximately equal to the rate of the addition of the $SO_3$ in the gas stream. The sodium sulfate dissolved in the molten sodium pyrosulfate and reacts with the $SO_3$ to produce additional sodium pyrosulfate.

The temperature of the melt of sodium pyrosulfate is maintained between 400° C. (the melting point of the $Na_2S_2O_7$) and 460° C. (the decomposition point of the $Na_2S_2O_7$) (Cambi and Bozza, Annali di Chimica Applicati, 13, 221–238 (1923)).

Unless the reaction is effected in poorly insulated equipment, the thermal content of the added sodium sulfate and of the $SO_3$ and $Cl_2$ gas mixture, together with the heat of reaction of the sodium sulfate and the sulfur trioxide, serve to maintain the temperature of the melt within the desired range without the necessity of providing an additional or extraneous source of heat. In industrial practice, therefore, it is necessary to consume fuel at only one point in the process, i. e. at the reactor (step A). According to Hixson and Tenney (Ind. Eng. Chem, 33, 1472–1484 (December 1941)), the heat of the reaction:

$$2Na_2S_2O_7 + 2NaCl \rightarrow 3Na_2SO_4 + SO_2 + Cl_2$$

is 39,210 cals./mole, whereas the exothermic reaction:

$$Na_2SO_4 + SO_3 \rightarrow Na_2S_2O_7$$

evolves 30,600 cals./mole, both being computed under standard conditions.

The gases effluent from the pyrosulfate melt (step C) will contain all of the chlorine formed in the reactor (step A) together with the small amount of sulfur dioxide remaining from the incomplete conversion to $SO_3$ in the contact converter (step B). The $SO_2$ may be scrubbed from the gas mixture, if that is desired. Thus, the mixture may be passed through water, which will remove the $SO_2$ at the expense of an equimolar amount of the chlorine:

$$SO_2 + Cl_2 + 2H_2O \rightarrow H_2SO_4 + 2HCl$$

However, I prefer to remove the small amount of $SO_2$ from the gas mixture by passing the same over a catalyst bed of activated carbon, whereby sulfuryl chloride is formed:

$$SO_2 + Cl_2 \rightarrow SO_2Cl_2$$

(British Patent 122,516; U. S. Patent 1,536,708; U. S. Patent 1,765,688; Canadian Patent 251,586; German Patent 522,884; McKee and Salls, Ind. Eng. Chem., 16, 279 (1924); Pope, Rec. trav. Chim. Pays-Bas, 42, 939 (1923); Meyer, Zeit. angew. Chem., 44, 41 (1931)), and a substantially $SO_2$-free chlorine-containing gas is obtained. The optimum temperature for this reaction is between 0° C. and 60° C., and preferably about 30° C. The sulfuryl chloride thus obtained represents a valuable by-product of this process, for which a great many uses and a considerable market exists (Brown, Ind. Eng. Chem. 36, 785–791 (September, 1944)).

The chlorine gas thus obtained, usually in 2% to 20% concentration, admixed with nitrogen and other fixed gases derived from the air, may be employed for almost any purpose requiring the use of this halogen. Thus, the kraft paper manufacturing industry consumes very considerable quantities of both sodium sulfate (salt cake) and chlorine. The present invention provides a simple and compact process whereby both of these products can be manufactured simultaneously in isolated units, from cheap and readily available raw materials and without recourse to electrolytic procedures.

Bleaching solutions (based on sodium hypochlorite) and solid bleaches (based on calcium hypochlorite or chlorinated lime) can similarly be readily prepared from the dilute chlorine gas obtained by this process.

In organic chlorinations, a diluted stream of chlorine is often preferable to the pure gas, since the inert diluents in the former case serve to moderate the heat of the reaction, which is usually exothermic. There are very few instances where such a diluted stream of chlorine can not be employed to advantage.

Scrubbing the traces of $SO_2$ from the chlorine-containing gas is an optional procedure, since for most reactions in which the chlorine is to be used, the presence of a small amount of $SO_2$ is not deleterious.

It will be obvious to any person skilled in the art that potassium sulfate and chlorine may similarly be prepared from potassium chloride, sulfur dioxide and air as raw materials. In a process of this nature, the pyrosulfate melt (step C) would consist of potassium pyrosulfate maintained between its melting point (325° C.) and its decomposition point (600° C.) The reaction temperatures of the potassium pyrosulfate and the potassium chloride in the reactor (step A) would be substantially the same as those indicated for the corresponding sodium salts.

Having described my invention, what I claim and desire to protect by Letters Patent is:

1. A cyclic process for the manufacture of sodium sulfate and chlorine which comprises the steps: (A) reacting sodium pyrosulfate and sodium chloride to produce sodium sulfate and a mixture of sulfur dioxide and chlorine, (B) admixing the gas mixture obtained in step A with additional sulfur dioxide and an oxygen-containing gas and passing said admixture through a catalytic sulfuric acid contact converter, whereby a mixture of sulfur trioxide and chlorine is obtained, and (C) passing the mixture of sulfur trioxide and chlorine obtained in step B through a melt of preformed sodium pyrosulfate while adding to said melt a portion of the sodium sulfate obtained in step A, whereby the sodium pyrosulfate required for step A is formed and a chlorine-containing gas is recovered.

2. A cyclic process for the manufacture of sodium sulfate and chlorine which comprises the steps: (A) reacting two moles of sodium pyrosulfate and two moles of sodium chloride to produce three moles of sodium sulfate and a gas mixture containing one mole of sulfur dioxide and one mole of chlorine, (B) admixing the gas mixture obtained in step A with an additional one mole of sulfur dioxide and at least two moles of oxygen in an oxygen-containing gas and passing said admixture through a catalytic sulfuric acid contact converter, whereby a mixture of two moles of sulfur trioxide and one mole of chlorine is obtained, and (C) passing the mixture of sulfur trioxide and chlorine obtained in step B through a melt of preformed sodium pyrosulfate while adding to said melt two moles of the sodium sulfate obtained in step A, whereby the two moles of sodium pyrosulfate required for step A is formed and a gas containing one mole of chlorine is obtained.

3. A cyclic process for the manufacture of sodium sulfate and chlorine which comprises the steps: (A) reacting two moles of sodium pyrosulfate with two moles of sodium chloride at a temperature between 325° C. and 600° C. to produce three moles of sodium sulfate and a gas mixture containing one mole of sulfur dioxide and one mole of chlorine, (B) admixing the gas mixture obtained in step A with an additional one mole of sulfur dioxide and at least two moles of oxygen in an oxygen-containing gas and passing said admixture through a vanadium catalyst sulfuric acid contact converter at a temperature between 375° C. and 500° C., whereby a mixture of two moles of sulfur trioxide and one mole of chlorine is obtained, and (C) passing the mixture of sulfur trioxide and chlorine obtained in step B through a melt of preformed sodium pyrosulfate at a temperature between 400° C. and 460° C. while adding to said melt two moles of the sodium sulfate obtained in step A, whereby the two moles of sodium pyrosulfate required for step A is formed and a gas containing one mole of chlorine is obtained.

4. A cyclic process for the manufacture of sodium sulfate and chlorine which comprises the steps: (A) reacting two moles of sodium pyrosulfate with two moles of sodium chloride at a temperature between 525° C. and 575° C. to produce three moles of sodium sulfate and a gas mixture containing one mole of sulfur dioxide and one mole of chlorine, (B) admixing the gas mixture obtained in step A with an additional one mole of sulfur dioxide and at least two moles of oxygen in an oxygen-containing gas and passing said admixture through a vanadium catalyst sulfuric acid converter at a temperature between 375° C. and 500° C., whereby a mixture of two moles of surfur trioxide and one mole of chlorine is obtained, and (C) passing the mixture of sulfur trioxide and chlorine obtained in step B through a melt of preformed sodium pyrosulfate at a temperature between 400° C. and 460° C., while adding to said melt two moles of the sodium sulfate obtained in step A, whereby the two moles of sodium pyrosulfate required for step A is formed and a gas containing one mole of chlorine is obtained.

5. In a cyclic process for the manufacture of sodium sulfate and chlorine, the step which comprises reacting equimolecular proportions of sodium pyrosulfate and sodium chloride at a temperature between 325° C. and 600° C., whereby sodium sulfate and a gas mixture of sulfur dioxide and chlorine are obtained.

6. In a cyclic process for the manufacture of sodium sulfate and chlorine, the step which comprises reacting equimolecular proportions of sodium pyrosulfate and sodium chloride at a temperature between 525° C. and 575° C., whereby sodium sulfate and a gas mixture of sulfur dioxide and chlorine are obtained.

7. In a cyclic process for the manufacture of sodium sulfate and chlorine, the step which comprises passing a mixture of sulfur trioxide and chlorine through a preformed melt of sodium pyrosulfate while adding sodium sulfate to said melt, whereby additional sodium pyrosulfate is formed and a chlorine-containing gas is recovered.

8. In a cyclic process for the manufacture of sodium sulfate and chlorine, the step which comprises passing a mixture of two moles of sulfur trioxide and one mole of chlorine through a preformed melt of sodium pyrosulfate while adding two moles of sodium sulfate to said melt, whereby two moles of additional sodium pyrosulfate is formed and a gas containing one mole of chlorine is recovered.

9. In a cyclic process for the manufacture of sodium sulfate and chlorine, the step which comprises passing a mixture of two moles of sulfur trioxide and one mole of chlorine through a preformed melt of sodium pyrosulfate at a temperature between 400° C. and 460° C., while adding two moles of sodium sulfate to said melt, whereby two moles of additional sodium pyrosulfate is formed and a gas containing one mole of chlorine is recovered.

10. A cyclic process for the manufacture of a compound of the general formula $M_2SO_4$, where M represents an alkali metal chosen from the couple consisting of sodium and potassium, and chlorine, which comprises the steps: (A) reacting a pyrosulfate of formula $M_2S_2O_7$ with a chloride of formula $MCl$ to produce $M_2SO_4$, and a mixture of sulfur dioxide and chlorine, (B) admixing the gas mixture obtained in step A with additional sulfur dioxide and an oxygen-containing gas and passing said admixture through a catalytic sulfuric acid contact converter, whereby a mixture of sulfur trioxide and chlorine is obtained, and (C) passing the mixture of sulfur trioxide and chlorine obtained in step B through a melt of preformed pyrosulfate of formula $M_2S_2O_7$ while adding to said melt a portion of the sulfate of formula $M_2SO_4$ obtained in step A, whereby the pyrosulfate of formula $M_2S_2O_7$ required for step A is formed and a chlorine-containing gas is recovered.

11. A cyclic process for the manufacture of potassium sulfate and chlorine which comprises the steps: (A) reacting two moles of potassium pyrosulfate with two moles of potassium chloride at a temperature between 525° C. and 575° C. to produce three moles of potassium sulfate and a gas mixture containing one mole of sulfur dioxide and one mole of chlorine, (B) admixing the gas mixture obtained in step A with an additional one mole of sulfur dioxide and at least two moles of oxygen in an oxygen containing gas and passing the admixture through a vanadium catalyst sulfuric acid contact converter at a temperature between 375° C. and 500° C. to produce a mixture of two moles of sulfur trioxide and one mole of chlorine, and (C) passing the mixture of sulfur trioxide and chlorine obtained in step B through a melt of preformed potassium pyrosulfate at a temperature between 325° C. and 600° C., while adding to said melt two moles of the potassium sulfate obtained in step A, whereby the two moles of potassium pyrosulfate required for step A is formed and a gas containing one mole of chlorine is obtained.

JONAS KAMLET.

REFERENCES CITED

The following references are of record in the file of this patent:

UNITED STATES PATENTS

| Number | Name | Date |
| --- | --- | --- |
| 2,276,079 | Maude | Mar. 10, 1942 |